(12) United States Patent
Jeong et al.

(10) Patent No.: US 11,178,695 B2
(45) Date of Patent: Nov. 16, 2021

(54) APPARATUS AND METHOD FOR ADAPTIVELY DETERMINING TX BEAM SUBSET FOR RANDOM ACCESS IN WIRELESS COMMUNICATION SYSTEM

(71) Applicant: Samsung Electronics Co., Ltd., Gyeonggi-do (KR)

(72) Inventors: Cheol Jeong, Gyeonggi-do (KR); Jeong-Ho Park, Seoul (KR); Su-Ryong Jeong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 485 days.

(21) Appl. No.: 14/313,759

(22) Filed: Jun. 24, 2014

(65) Prior Publication Data

US 2014/0376466 A1 Dec. 25, 2014

(30) Foreign Application Priority Data

Jun. 24, 2013 (KR) .................. 10-2013-0072590

(51) Int. Cl.
 *H04W 74/08* (2009.01)
 *H04B 7/06* (2006.01)
 *H04B 7/0404* (2017.01)

(52) U.S. Cl.
 CPC ...... *H04W 74/0833* (2013.01); *H04B 7/0695* (2013.01); *H04B 7/0404* (2013.01); *H04B 7/0691* (2013.01)

(58) Field of Classification Search
 CPC .......................... H04B 7/0695; H04W 74/0833
 See application file for complete search history.

(56) References Cited

U.S. PATENT DOCUMENTS

| | | | |
|---|---|---|---|
| 8,019,016 B1* | 9/2011 | Lee et al. | 375/299 |
| 2006/0198338 A1* | 9/2006 | Ishii et al. | 370/329 |
| 2007/0099578 A1 | 5/2007 | Adeney et al. | |
| 2007/0147310 A1* | 6/2007 | Cai | 370/335 |
| 2007/0171847 A1* | 7/2007 | Demaj et al. | 370/310 |

(Continued)

FOREIGN PATENT DOCUMENTS

KR  10-2012-0086331  8/2012

OTHER PUBLICATIONS

Notice of Final Rejection dated Feb. 2, 2020 in connection with Korean Patent Application No. 10-2013-0072590, 6 pages.

(Continued)

*Primary Examiner* — Angel T Brockman

(57) ABSTRACT

To adaptively determine a Tx beam subset for random access in a wireless communication system, a method for operating a Mobile Station (MS) includes determining at least one beam subset which satisfies a predefined condition, among a plurality of beam subsets, and transmitting random access preambles using Tx beams of the at least one beam subset. An MS in a wireless communication system includes a controller configured to determine at least one beam subset that satisfies a condition, among a plurality of beam subsets, and a transmitter configured to transmit random access preambles using Transmit (Tx) beams of the at least one beam subset, wherein the plurality of the beam subsets each comprise a plurality of beams radiating to different directions from one another. Other embodiments including a base station and a mobile station are also disclosed.

32 Claims, 8 Drawing Sheets

(56) References Cited

U.S. PATENT DOCUMENTS

| | | | |
|---|---|---|---|
| 2008/0043613 A1* | 2/2008 | Yang et al. | 370/208 |
| 2008/0175173 A1* | 7/2008 | Ross et al. | 370/256 |
| 2010/0091726 A1* | 4/2010 | Ishii et al. | 370/329 |
| 2012/0020420 A1* | 1/2012 | Sakoda et al. | 375/259 |
| 2012/0282970 A1* | 11/2012 | Kela | H04W 52/146 455/522 |
| 2013/0039345 A1* | 2/2013 | Kim et al. | 370/332 |
| 2013/0051302 A1* | 2/2013 | Kim | 370/312 |

OTHER PUBLICATIONS

Notice of Patent Grant in connection with Korean Application No. 10-2013-0072590 dated Mar. 5, 2020, 4 pages.

Notice of Preliminary Rejection dated Oct. 24, 2019 in connection with Korean Patent Application No. 10-2013-0072590, 11 pages.

* cited by examiner

APPARATUS AND METHOD FOR ADAPTIVELY DETERMINING TX BEAM SUBSET FOR RANDOM ACCESS IN WIRELESS COMMUNICATION SYSTEM

CROSS-REFERENCE TO RELATED APPLICATION AND CLAIM OF PRIORITY

The present application is related to and claims the benefit under 35 U.S.C. § 119(a) to a Korean patent application No. 10-2013-0072590 filed in the Korean Intellectual Property Office on Jun. 24, 2013, the entire disclosure of which is hereby incorporated by reference.

TECHNICAL FIELD

The present disclosure relates generally to random access in a wireless communication system.

BACKGROUND

To transmit and receive data in a wireless communication system, a terminal needs to access a network. Communication standards such as Worldwide Interoperability for Microwave Access (WiMAX) and $3^{rd}$ Generation Partnership Project (3GPP) Long Term Evolution (LTE) provide interfaces for connecting the terminal to the network. A channel for this connection is referred to as a random access channel or a ranging channel.

An advanced communication can adopt broadband in extremely high frequency for the data transmission and reception in order to increase communication capacity. It is difficult to ensure broadband frequency resources in a frequency domain of 2.5 GHz or 5 GHz of the LTE, whereas it is relatively easy to ensure the wide bandwidth in a millimeter band of 30 GHz. However, as the frequency band widens, a path loss mostly increases. Hence, to compensate for the increasing path loss in the wireless communication system operating in the extremely high frequency band, it is required to raise a beamforming gain using a plurality of antennas in the terminal and a base station. As the number of the antennas increases, the beamwidth reduces and the beamforming gain rises. As the number of the antennas decreases, the beamwidth widens and the beamforming gain falls. Since the beam is directional, beam directions of the terminal and the base station need to be alike for the sake of the greater beamforming gain.

When attempting to access the network over the random access channel for the first time, the terminal cannot locate the base station. When the wireless communication system using the extremely high wideband conducts beamforming using a plurality of antennas, the terminal needs to use the beams of several directions. The terminal uses the beams in a specific order. When the optimal beam is used last, it takes quite a long time to access the network.

Typically, the random access channel is designed by taking into account user performance in a cell boundary. Hence, a length of a random access preamble used for the random access is long enough for the cell-boundary user to satisfy given detection rate and false alarm rate. If the cell-center user performs the random access in the same manner as the cell-boundary user, then it will take the time for the cell-center user to access the network as long as the cell-boundary user although the cell-center user can have a better channel quality than the cell-boundary user. Hence, in the network access attempt, an adaptive beam selection method based on the user's channel condition is demanded.

SUMMARY

To address the above-discussed deficiencies, it is a primary aspect of the present disclosure to provide an apparatus and a method for effective random access in a wireless communication system.

Another aspect of the present disclosure is to provide an apparatus and a method for adaptively selecting a beam according to channel condition in a wireless communication system.

Yet another aspect of the present disclosure is to provide an apparatus and a method for selecting a beam subset for random access from a plurality of beam subsets in a wireless communication system.

Still another aspect of the present disclosure is to provide an apparatus and a method for selecting a beam subset which satisfies a condition for expecting preamble transmission success for random access among a plurality of beam subsets in a wireless communication system.

According to one aspect of the present disclosure, a method for operating a Mobile Station (MS) in a wireless communication system includes determining at least one beam subset which satisfies a predefined condition, among a plurality of beam subsets; and transmitting random access preambles using Tx beams of the at least one beam subset. The plurality of the beam subsets each includes a plurality of beams radiated to different directions.

According to another aspect of the present disclosure, an apparatus of an MS in a wireless communication system includes a controller for determining at least one beam subset which satisfies a predefined condition, among a plurality of beam subsets; and a transmitter for transmitting random access preambles using Tx beams of the at least one beam subset. The plurality of the beam subsets each includes a plurality of beams radiated to different directions.

According to yet another aspect of the present disclosure, a method for operating a Base Station (BS) in a wireless communication system includes receiving random access preambles Tx-beamformed by an MS on Tx beams of at least one beam subset, from the MS. The at least one beam subset includes at least one beam subset which satisfies a predefined condition among a plurality of beam subsets, and the plurality of the beam subsets each includes a plurality of beams radiated to different directions.

According to still another aspect of the present disclosure, an apparatus of a BS in a wireless communication system includes a receiver for receiving random access preambles Tx-beamformed by a Mobile Station (MS) on Tx beams of at least one beam subset, from the MS. The at least one beam subset includes at least one beam subset which satisfies a predefined condition among a plurality of beam subsets, and the plurality of the beam subsets each include a plurality of beams radiating to different directions from one another.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present disclosure provide a technique for adaptively conducting random access based on a channel condition when a Mobile Station (MS) attempts to access a network using a plurality of beams in a wireless communication system.

Hereinafter, a wireless communication system based on Orthogonal Frequency Division Multiplexing (OFDM)/Orthogonal Frequency Division Multiple Access (OFDMA) is explained by way of example.

Figure 1:
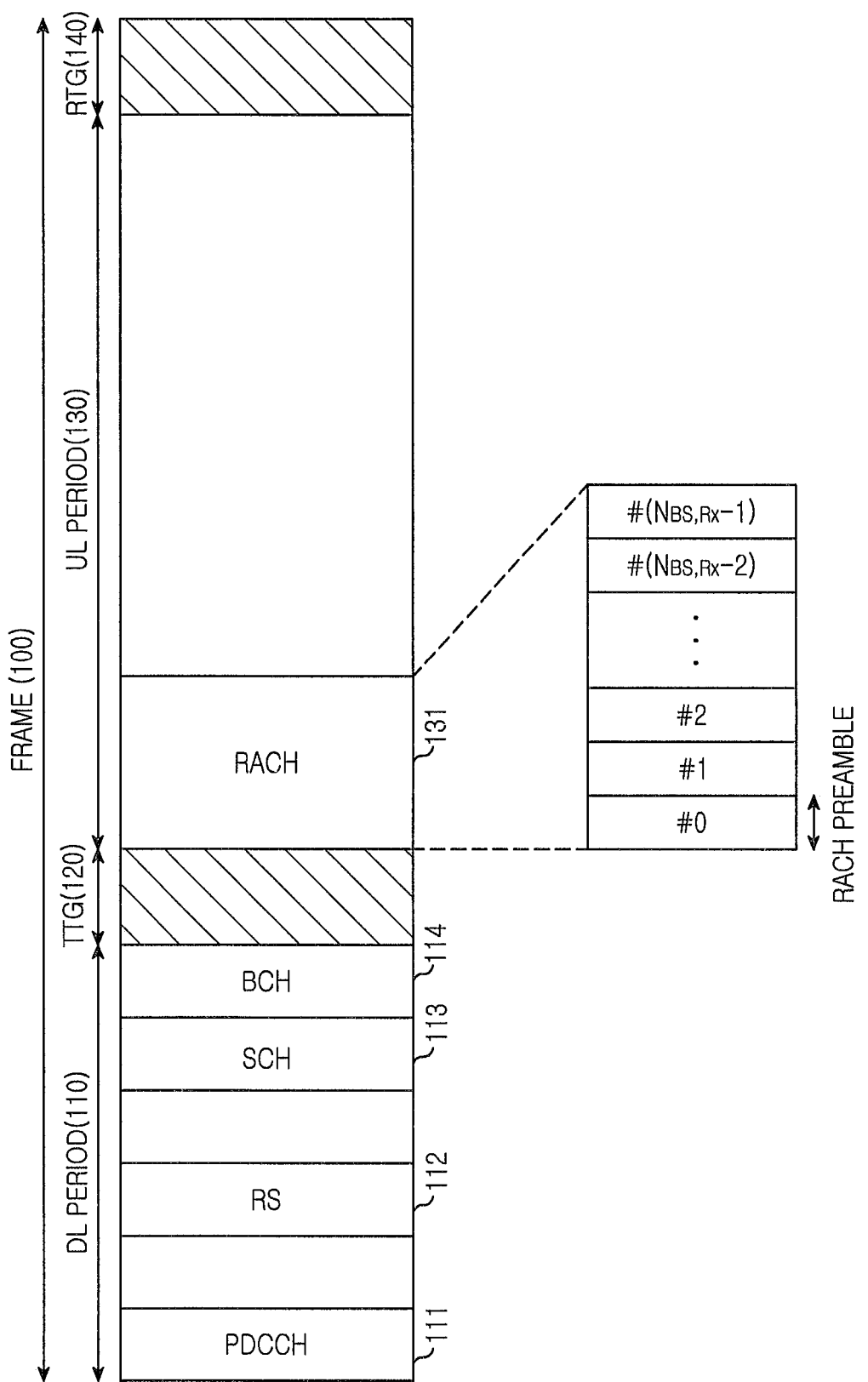
FIG. 1 illustrates a TDD radio frame in a wireless communication system according to an exemplary embodiment of the present disclosure.

FIG. 1 depicts a Time Division Duplex (TDD) radio frame in a wireless communication system according to an exemplary embodiment of the present disclosure.

Referring to FIG. 1, a frame 100 includes a DownLink (DL) period 110, a Transmit/receive Transition Gap (TTG) 120, an UpLink (UL) period 130, a Receive/transmit Transition Gap (RTG) 140. The DL period 110 includes a Physical Downlink Control Channel (PDCCH) 111, a Reference Signal (RS) 112, a Synchronization Channel (SCH) 113, and a Broadcast Channel (BCH) 114. The PDCCH 111 carries information required to receive data at an MS. For example, the information carried by the PDCCH 111 includes a data type, a transmission method, and a data location. Before accessing a network, the MS obtains DL synchronization using the SCH 113 and then receives information required for random access over the BCH 114. The information required for the random access includes at least one of a resource location allocated for the random access, an Rx beamwidth $\theta_{BS,Rx}$ used by a Base Station (BS), Rx beamforming gain of the BS, and the number of Rx beams $N_{BS,Rx}$ used by the BS in the random access period.

Referring to FIG. 1, a Random Access Channel (RACH) 131 is allocated for the random access in the UL period 130. Using one of $N_{MS,Tx}$-ary Tx beams, the MS transmits random access preambles as many as the Rx beams $N_{BS,Rx}$ of the BS over the RACH 131 of the UL period 130. The BS attempts to detect the random access preamble using the signal received over the RACH 131. For example, the BS can detect the preamble using correlation.

Upon successfully detecting the preamble, the BS transmits a random access response to the MS which transmits the detected preamble in the following DL period 110. In so doing, the information required for the MS to receive the random access response signal such as resource (e.g., time/frequency resource) location for carrying the random access response and modulation/coding scheme can be carried on the PDCCH 111 of the DL period 110.

The MS receiving the random access response transmits information required for the BS using the UL data resource. For example, the MS can transmit its identification information. In so doing, when a plurality of MSs uses the same sequence as the preamble, the BS selects one MS through contention resolution, and transmits information including identification information of the selected MS using the DL data resource.

Figure 2:
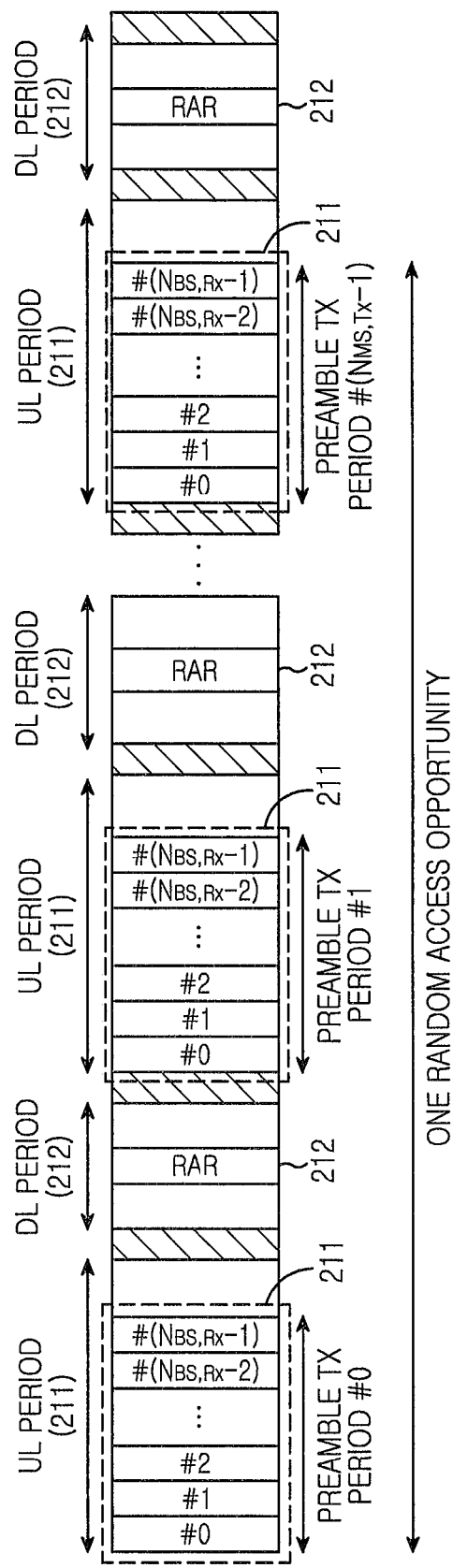
FIG. 2 illustrates a period for transmitting a random access preamble and a period for receiving a random access response in the wireless communication system according to an exemplary embodiment of the present disclosure.

FIG. 2 depicts a period for transmitting the random access preamble and a period for receiving the random access response in the wireless communication system according to an exemplary embodiment of the present disclosure.

Referring to FIG. 2, the MS attempts the random access $N_{MS,Tx}$ times at maximum during a single random access opportunity. That is, the MS transmits the random access preambles by changing the beam for $N_{MS,Tx}$ times at maximum during one random access opportunity. In so doing, in every attempt, the MS repeatedly transmits the random access preambles as many $N_{BS,Rx}$ times as the Rx beams of the BS, using the same Tx beam in the preamble Tx period. Herein, the preamble Tx period can occupy part or all of the RACH of FIG. 1. As a result, the MS can transmit the $N_{MS,Tx} \times N_{BS,Rx}$-ary random access preambles at maximum during one random access opportunity.

The random access in one frame is explained now. First, the MS transmits preambles 211. Next, the BS detects at least one of the preambles 211 from the MS and transmits a random access response 212. Upon receiving the random access response 212, the MS determines the successful preamble transmission for the random access and performs a next process for the random access. For example, the next process can include identification information transmission of the MS, and resource and identifier allocation of the BS. By contrast, when not receiving the random access response 212, the MS retransmits the preambles 211 using other beam in the next random access preamble Tx period. This process is repeated $N_{MS,Tx}$ times at maximum in every frame and thus the single random access opportunity ends.

In FIG. 2, the MS changes the Tx beam every time the frame is changed. That is, the change cycle of the Tx beam is the frame. Yet, the change cycle of the Tx beam can not correspond to the frame. For example, the Tx beam can change in the middle of the frame.

Figure 3:
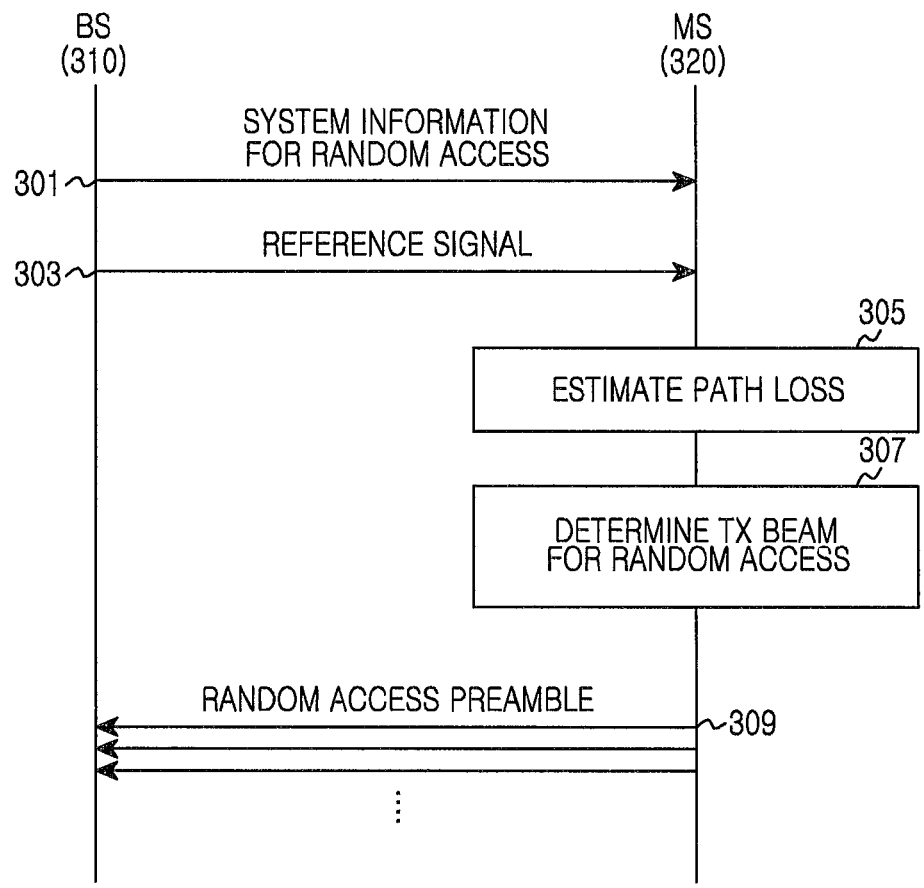
FIG. 3 illustrates signaling for transmitting the random access preamble in the wireless communication system according to an exemplary embodiment of the present disclosure.

FIG. 3 depicts signaling for transmitting the random access preamble in the wireless communication system according to an exemplary embodiment of the present disclosure.

Referring to FIG. 3, a BS 310 transmits system information required for the random access to an MS 320 in step 301. The system information can be carried on the BCH. The information required for the random access includes at least one of the resource location allocated for the random access, the Rx beamwidth $\theta_{BS,Rx}$ used by the BS, Rx beamforming gain of the BS, and the number of the Rx beams $N_{BS,Rx}$ used by the BS in the random access period.

In step 303, the BS 310 transmits a DL reference signal to the MS 320. The reference signal, which is a signal sequence of a predefined value, can include a common reference signal in the cell or a dedicated reference signal for the MS 320.

In step 305, the MS 320 receiving the reference signal estimates a path loss using the reference signal. The path loss estimation can vary according to exemplary embodiments of the present disclosure. For example, the path loss can be estimated based on Equation 1.

$$PL = P_{BS,Tx} - P_{MS,Rx} + G_{BS,Tx} + G_{MS,Rx} \quad (1)$$

In Equation 1, PL denotes the path loss, $P_{BS,Tx}$ denotes a BS Tx power when the ES transmits the reference signal, $P_{MS,Rx}$ denotes an Rx power when the MS receives the reference signal, $G_{BS,Tx}$ denotes a Tx beam gain determined by physical characteristics (e.g., beamwidth) of the beam used for the BS to transmit the reference signal, and $G_{MS,Rx}$ denotes an Rx beam gain determined by the physical characteristics of the beam used for the MS to receives the reference signal.

In step 307, the MS 320 determines Tx beams for the random access. In so doing, the MS 320 considers the path loss. When the BS 310 operates a plurality of Tx beams and the MS 320 operates a plurality of Rx beams, the path loss estimated in step 305 can include path loss values of the Tx/Rx beam pairs. In this case, one representative value determined from the path loss values is considered to determine the Tx beam in step 307. The representative value can be determined in various fashions. For example, the representative value can be an average of the path loss values.

In step 309, the MS 320 transmits the random access preambles using the determined Tx beams. In so doing, the MS 320 transmits the random access preambles as many as the Rx beams of the BS 310 using the single Tx beam.

As such, when determining the beams for the random access, the MS selects one of the beam subsets predefined. Herein, the beam subset is a set of beams radiated to different directions. That is, the MS stores multiple beam subsets predefined, and each beam subset is defined as a combination of the beams. Herein, the beam subsets can be defined based on various criteria. For example, the criterion for classifying the beam subsets can be defined variously using a main lobe direction, the beam gain, the beamwidth, or their combination. The variety of the beam subset can be limited by beamforming capability of the MS.

For example, the beam subsets can be defined based on the beamwidth. More specifically, a first beam subset can be defined as a set of beams having the beamwidth $A_1$, a second beam subset can be defined as a set of beams having the beamwidth $A_2$, and a third beam subset can be defined as a set of beams having the beamwidth $A_3$. As the beamwidth gets narrow, the number of the beams of the corresponding beam subset can increase.

For example, one beam subset can include beams of different beamwidths. In this case, the beam subsets are not classified solely based on the beamwidth. For example, hardware beamforming capability of the antennas of the MS can differ. In this case, it is not all of the antennas cannot guarantee the beamwidths of the same type. Hence, while the beams toward a particular direction have the same beamwidth in the different beam subsets, the beams toward different directions can have different beamwidths. More specifically, when the antenna for a first range of the MS can form the beams in three widths of 60°, 30°, and 15° and the antenna for a second range forms only the beam of the width 60°, the beam of the second range can be fixed to the beam of the width 60° and the beam of the first range can be one selected from the three beamwidths. Accordingly, one beam subset can include the beams of the different beamwidths.

When attempting the random access, the MS can transmit a plurality of beams of different directions. For doing so, the Tx beam subsets can be defined based on the number of the beams or the beam transmission order. Now, the beam transmission for the random access is explained in detail.

Figure 4:
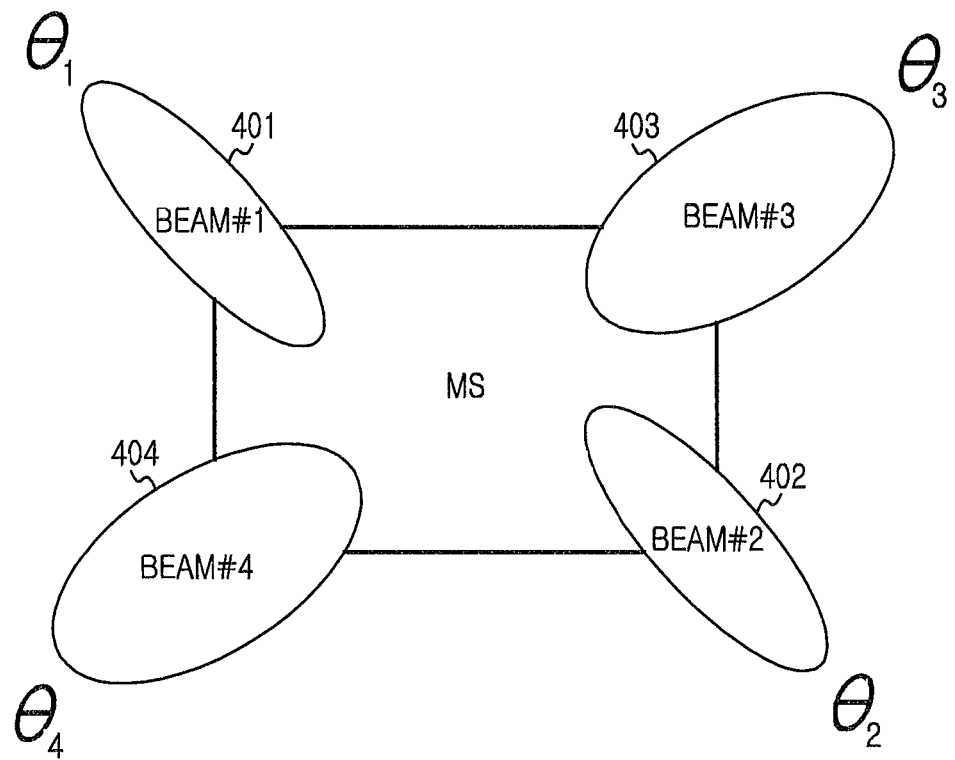
FIG. 4 illustrates a beam subset for the random access in the wireless communication system according to an exemplary embodiment of the present disclosure.

One beam subset can include four beams 401 through 404 as shown in FIG. 4. Beam characteristics of FIG. 4 are listed in Table 1.

TABLE 1

| Beam number | Beam direction | Beam gain | Beam width |
|---|---|---|---|
| 1 | $\theta_1$ | 7 | 15 |
| 2 | $\theta_2$ | 7 | 15 |
| 3 | $\theta_3$ | 5 | 20 |
| 4 | $\theta_4$ | 5 | 20 |

In the first RACH preamble Tx period, the MS transmits $N_{BS,Rx}$-ary preambles using the first beam 401. The MS determines whether the BS successfully detects the preamble in a preset region of the next DL Tx period. When not receiving the random access response message from the BS, the MS transmits $N_{BS,Rx}$-ary preambles using the second beam 402 in the second RACH preamble Tx period. This process is repeated for the third beam 403 and the fourth beam 404. When receiving no random access response message even after transmitting the preamble on the fourth beam 404, the MS determines the failure of the first random access attempt.

Figure 5:
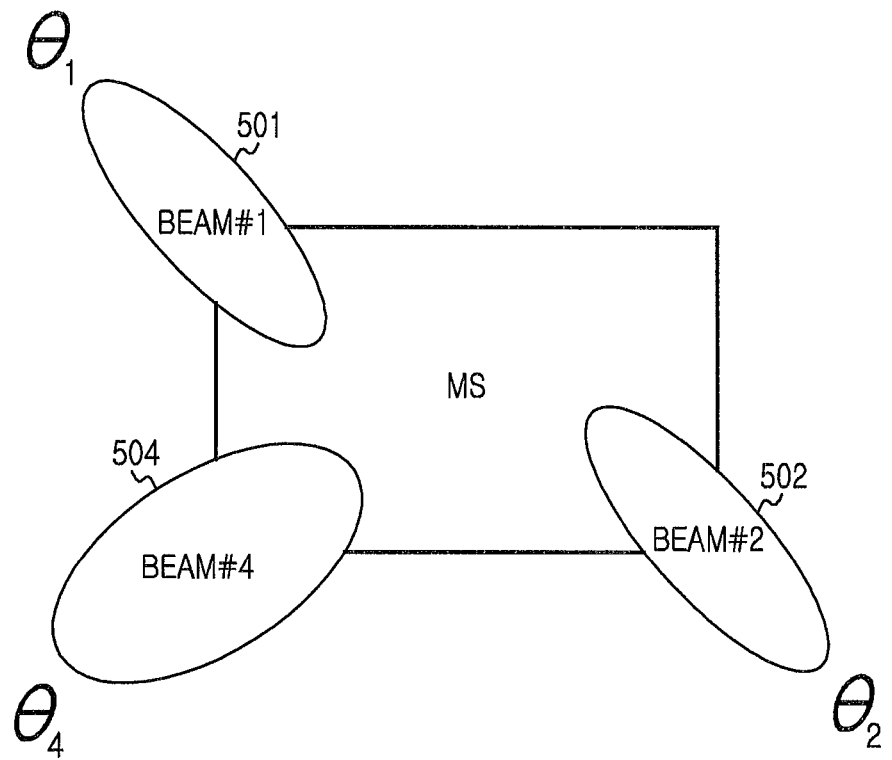
FIG. 5 illustrates the modified beam subset for the random access in the wireless communication system according to an exemplary embodiment of the present disclosure.

The beam subset can be temporarily modified by considering the channel condition. For example, the beam subset can be redefined based on a DL signal strength measured by the MS. In detail, when the DL signal strength corresponding to the third Tx beam 403 of the MS is very weak or the path loss is considerable, the MS can exclude the third beam 403 from the beam subset. In this case, the beam subset includes a first beam 501, a second beam 502, and a fourth beam 504 as shown in FIG. 5.

As such, as transmitting the random access preamble through the Tx beamforming, the Tx power of the preamble can be determined based on Equation 2:

$$P_{MS,Tx_i} = \min\{P_{MS,Tx_{max}}, P_{target} - G_{BS,Rx} + (M_{RA}-1)\Delta P - G_{MS,Tx_i} + PL + P_{Format}\} \quad (2)$$

where $P_{MS,Tx_i}$ denotes the Tx power of the i-th beam of the beam subset, $P_{MS,Tx_{max}}$ denote a maximum Tx power value for the MS to transmit the random access preamble, $P_{target}$ denotes a target Rx power value of the BS to satisfy a target performance of the random access preamble, $G_{BS,Rx}$ denotes an Rx beam gain of the BS, $G_{MS,Tx_i}$ denotes the i-th Tx beam gain of the MS, $M_{RA}$ denotes the number of the random access attempts of the MS, $\Delta P$ denotes an increment used to increase the Tx power of the preamble after the random access attempt failure of the MS, and $P_{Format}$ denotes a variable used to adjust the necessary power value based on the type of the preamble when the random access preamble includes various types.

Herein, $P_{target} - G_{BS,Rx}$ are transmitted from the BS to the MSs in the cell. For doing so, the BS can transmit $P_{target}$ and $G_{BS,Rx}$ individually, or the single value $P_{target} - G_{BS,Rx}$. $\Delta P$ and $P_{Format}$ can be provided from the BS or predefined.

For the successful random access preamble detection of the BS, the MS needs to determine the Tx power of the preamble so as to satisfy the target Rx power. When the path loss is considerable, the target Rx power of the BS may not be satisfied with the small Tx beam gain of the MS though the MS uses the maximum Tx power. Thus, among the multiple subsets defined, the MS can exclude the beam subset including the beam not satisfying the target Rx power from the random access preamble transmission. In other words, the MS can select at least one beam subset including only the beams satisfying the target Rx power, as the beam subset for the random access preamble transmission.

For example, the MS can select at least one of K-ary beam subsets of which the beams satisfy a condition of Equation 3:

$$P_{MS,Tx_{max}} > P_{target} - G_{BS,Rx} + (M_{RA}-1)\Delta P - G_{MS,Tx_i} + PL + P_{Format} \quad (3)$$

where $P_{MS,Tx_{max}}$ denote the maximum Tx power value for the MS to transmit the random access preamble, $P_{target}$ denotes the target Rx power value of the BS to satisfy the target performance of the random access preamble, $G_{BS,Rx}$ denotes the Rx beam gain of the BS, $G_{MS,Tx_i}$ denotes the i-th Tx beam gain of the MS, $M_{RA}$ denotes the number of the random access attempts of the MS, $\Delta P$ denotes the increment used to increase the Tx power of the preamble after the random access attempt failure of the MS, and $P_{Format}$ denotes the variable used to adjust the necessary power value based on the type of the preamble when the random access preamble includes various types.

As above, the MS can select the beam subset for transmitting the random access preamble by comparing the maximum Tx power with the Tx power required to achieve the target Rx power of the BS. In some cases, a plurality of beam subsets can be selected. In this case, the MS needs to reselect one of the selected beam subsets. When multiple beam subsets satisfy a predefined condition, the criterion for reselecting one beam subset can vary. For example, the one beam subset can be selected based on at least one of history about the successful preamble transmission of the past random access, and the number of the beams. Herein, the successful preamble transmission history of the past random access can include at least one of a success probability and the number of the preamble transmissions until the success. Hereafter, the beam subsets satisfying the predefined condition include $\psi_1, \psi_2, \ldots, \psi_R$, and the number of the beams of the beam subset is $V_i$ (i=1, 2, . . . , R).

The selection based on the preamble transmission success probability for the random access can be performed as follows. When probabilities for R-ary beam subsets are $p_1, p_2, \ldots, p_R$, the sum of $p_1$ through $p_R$ is 1. The MS selects the r-th beam subset $\psi_r$ in the probability of $p_r$. When successfully transmitting the preamble for the random access using the selected beam subset $\psi_r$, the MS applies a weight $\alpha$ to the selected beam subset $\psi_r$ by considering the number of the transmitted preambles. For example, When successfully transmitting the preamble for the random access using the beam subset $\psi_1$, the MS updates the probability of the beam subset $\psi_1$ based on Equation 4.

$$\begin{aligned} p_1 + \alpha &\to p_1 \\ p_2 - \frac{\alpha}{R-1} &\to p_2 \\ &\vdots \\ p_R - \frac{\alpha}{R-1} &\to p_R \end{aligned} \quad (4)$$

where $p_r$ denotes the probability for the beam subset r, $\alpha$ denotes the probability weight according to the preamble transmission success for the random access, and R denotes the number of the beam subsets satisfying the condition.

Based on Equation 4, the MS sets $p_r$ to zero when the updated $p_r$ is smaller than zero, and readjusts α such that the sum of the probabilities of the beam subsets is 1. When the updated $p_r$ is greater than 1, the MS sets $p_r$ to 1 and sets the probability of the other beam subsets to zero. As a result, when a next random access attempt point arrives, the MS selects one beam subset based on the updated beam subset success probabilities.

The selection based on the number of the beams is conducted as follows. As the beam subset includes more beams, the number of the preambles to transmit for the random access attempt increases. Accordingly, the small number of the beams is advantageous in terms of signaling overhead and delay. Hence, the MS can select the beam subset including the smallest number of the beams among the beam subsets satisfying the condition.

The selection based on the number of the preamble transmissions until the success can be fulfilled as follows. The MS can estimate a detection probability of the random access preamble for each beam subset, and estimate an average of the preamble transmissions until the successful random access based on the detection probability. The estimate based on the beam subset can vary according to the channel condition or a travel speed of the MS. Hence, the MS can select the beam subset of the smallest average preamble transmissions.

The MS can accumulate data such as the success probability and the average preamble transmissions of the beam subsets through the multiple random access attempts, and thus enhance the selection performance based on the data.

As such, the MS selects the beam subset to be used for the random access attempt using a predefined condition. When a plurality of beam subsets satisfies the condition, the MS reselects one of the beam subsets as described above. When the i-th beam subset is selected, $N_{MS,Tx}$ is set to $V_i$.

When the random access attempt fails, the MS increases the Tx power by a predefined increment. Based on the increased Tx power, the MS determines whether each beam subset satisfies the predefined condition. For example, when the Tx power is determined based on Equation 2, $M_{RA}$ increases by 1 and the condition is defined based on Equation 3.

As mentioned above, when the random access attempt fails, the Tx power increases by the predefined increment. The random access failure determination for increasing the Tx power can vary according to various exemplary embodiments. For example, the MS can transmit $N_{BS,Rx}$-ary preambles on the same Tx beam, determine the random access failure, and increase the Tx power. Alternatively, the MS can transmit $N_{BS,Rx}$-ary preambles, that is, $N_{MS,Tx} \times N_{BS,Rx}$-ary preambles for the beams of the selected beam subset, determine the random access failure, and increase the Tx power.

Thus, based on the determination time of the random access failure, Equation 2 can be replaced by Equation 5.

$$P_{MS,Tx_i} = \min\left\{P_{MS,Tx_{max}}, \quad P_{target} - G_{BS,Rx} + \left\lfloor \frac{M_{trans\,count}}{M_{ramping}} \right\rfloor \Delta P - G_{MS,Tx_i} + PL + P_{Format}\right\} \quad (5)$$

where $P_{MS,Tx_i}$ denotes the Tx power of the i-th beam of the beam subset, $P_{MS,Tx_{max}}$ denote the maximum Tx power value for the MS to transmit the random access preamble, $P_{target}$ denotes the target Rx power value of the BS to satisfy the target performance of the random access preamble, $G_{BS,Rx}$ denotes the Rx beam gain of the BS, $G_{MS,Tx_i}$ denotes the i-th Tx beam gain of the MS, $M_{trans\,count}$ denotes the number of the preamble transmissions, $M_{ramping}$ denotes a cycle for increasing the Tx power based on the number of the preamble transmissions, ⌊ ⌋ denotes a lowering operator, ⌊x⌋ denotes a maximum integer not exceeding x, ΔP denotes the increment used to increase the Tx power of the preamble after the random access attempt failure of the MS, and $P_{Format}$ denotes the variable used to adjust the necessary power value based on the type of the preamble when the random access preamble includes various types.

Based on Equation 5, when $M_{trans\,count}$ ranges from 1 to $M_{ramping}-1$, $$\left\lfloor \frac{M_{trans\,count}}{M_{ramping}} \right\rfloor$$

becomes zero. Hence, the Tx power of the random access preamble does not increases any more. When $M_{trans\,count}$ ranges from $M_{ramping}$ to $2 \times M_{ramping}-1$, $$\left\lfloor \frac{M_{trans\,count}}{M_{ramping}} \right\rfloor$$

becomes 1. Thus, the preamble Tx power increases by ΔP.

$M_{ramping}$ can be determined by the BS, or predefined. In this case, the BS can transmit $M_{ramping}$ to the MSs in the cell. Alternatively, $M_{ramping}$ can be predefined between the BS and the MS. When the Tx power is determined based on Equation 5, Equation 3 can be replaced by Equation 6.

$$P_{MS,Tx_{max}} > P_{target} - G_{BS,Rx} + \left\lfloor \frac{M_{trans\,count}}{M_{ramping}} \right\rfloor \Delta P - G_{MS,Tx_i} + PL + P_{Format} \quad (6)$$

where $P_{MS,Tx_{max}}$ denote the maximum Tx power value for the MS to transmit the random access preamble, $P_{target}$ denotes the target Rx power value of the BS to satisfy the target performance of the random access preamble, $G_{BS,Rx}$ denotes the Rx beam gain of the BS, $G_{MS,Tx_i}$ denotes the i-th Tx beam gain of the MS, $M_{trans\,count}$ denotes the number of the preamble transmissions, $M_{ramping}$ denotes the cycle for increasing the Tx power based on the number of the preamble transmissions, ⌊ ⌋ denotes the lowering operator, ⌊x⌋ denotes the maximum integer not exceeding x, ΔP denotes the increment used to increase the Tx power of the preamble after the random access attempt failure of the MS, and $P_{Format}$ denotes the variable used to adjust the necessary power value based on the type of the preamble when the random access preamble includes various types.

Figure 6:
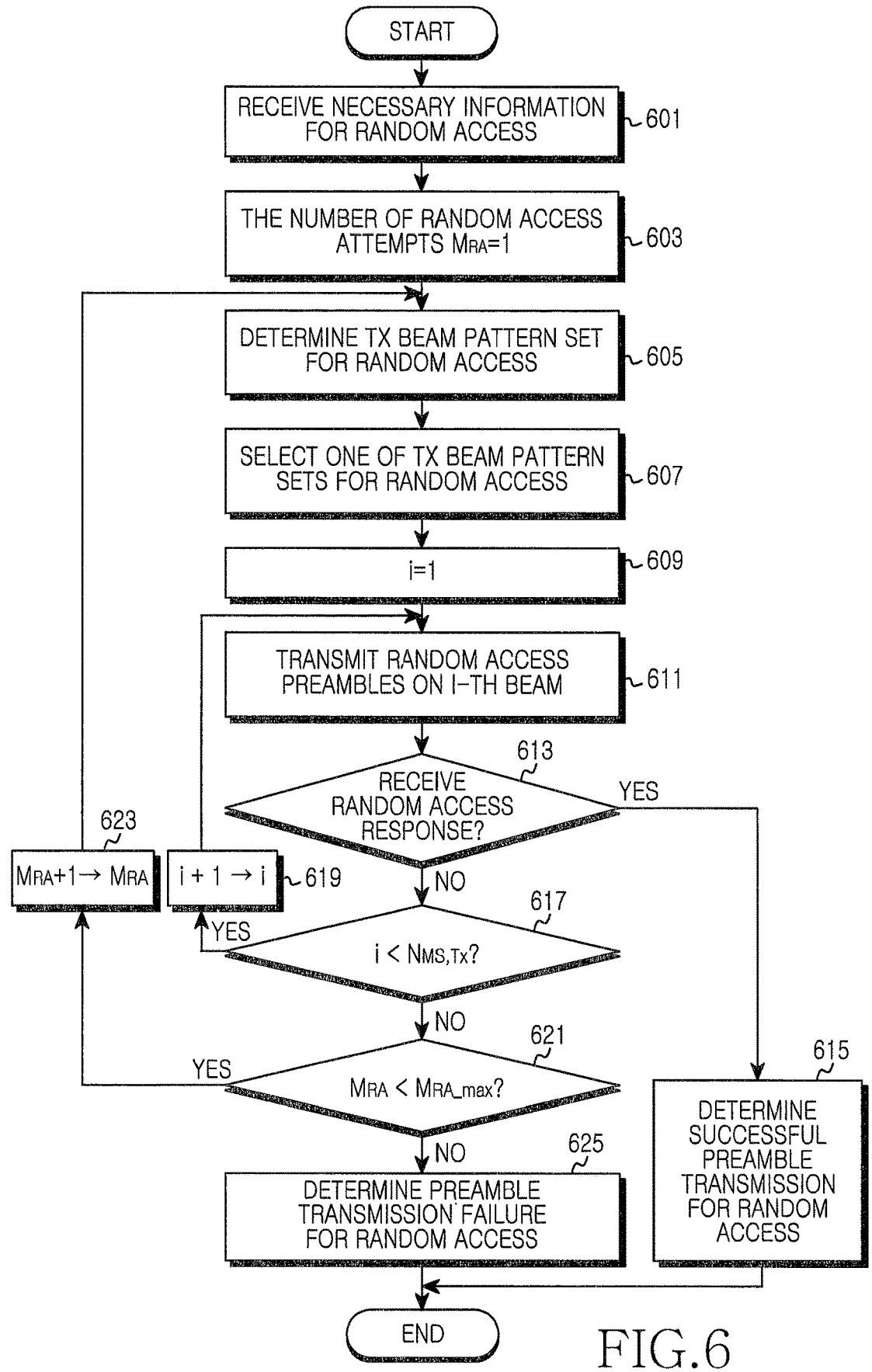
FIG. 6 illustrates operations of an MS in the wireless communication system according to an exemplary embodiment of the present disclosure.

FIG. 6 illustrates operations of the MS in the wireless communication system according to an exemplary embodiment of the present disclosure.

Referring to FIG. 6, the MS receives the necessary information for the random access in step 601. The necessary information for the random access includes at least one of the resource location for the random access, the Rx beamwidth used by the BS, Rx beamforming gain of the BS, and the number of the Rx beams used by the BS in the random access period. The BS can periodically transmit the necessary information for the random access over the BCH.

In step 603, the MS sets the number of the random access attempts (=$M_{RA}$) to 1. In step 605, the MS determines the Tx beam subsets for the random access. Herein, the beam subsets include at least one beam subset which satisfies the predefined condition. For doing so, the MS determines whether the predefined beam subsets each satisfy the predefined condition. For example, the condition includes the information on whether the target Rx power of the BS can be satisfied by considering at least one of the beamforming gain, the path loss, the power adjustment value based on the preamble type. That is, the condition can specify that the required Tx power for achieving the target Rx power of the BS is smaller than the maximum Tx power of the MS. For example, the condition can be defined based on Equation 3 or Equation 6. When no beam subsets satisfy the condition, the MS defines all of the beam subsets as the Tx beam subsets and performs the next process.

In step 607, the MS selects one of the Tx beam subsets. When the beam subsets determined in step 605 include only one subset, the MS selects the one beam subset of the beam subsets. By contrast, when the beam subsets determined in step 605 include the plurality of the beam subsets, the MS selects one of the beam subsets according to a predefined rule.

In step 609, the MS sets the beam index i to 1. In step 611, the MS transmits the random access preamble over the i-th beam. Herein, the random access preamble using the i-th beam is transmitted as many times as the Rx beams of the BS.

In step 613, the MS determines whether the random access response is received. That is, the MS transmits the random access preamble and then determines whether the random access response is received in the next DL period.

Upon receiving the random access response, the MS determines the successful preamble transmission for the random access in step 615. Next, the MS proceeds to a next process for the network access, which is not illustrated in FIG. 6. For example, the next process can include the identification information transmission of the MS, and the resource and identifier allocation of the BS.

By contrast, when not receiving the random access response, the MS determines whether the beam index i is less than the number of the beams $N_{MS,Tx}$ of the selected beam subset in step 617. That is, the MS determines whether the selected beam subset still includes the unused beam.

When the beam index i is less than the number of the beams $N_{MS,Tx}$ of the selected beam subset, the MS increase the beam index i by 1 in step 619 and then returns to step 611. That is, the MS repeats steps 611 through 617 using the next beam of the selected beam subset.

By contrast, when the beam index i is greater than or equal to the number of the beams $N_{MS,Tx}$ of the selected beam subset, the MS determines whether the number of the random access attempts $M_{RA}$ is less than the maximum attempts $M_{RA_{max}}$ in step 621.

When the random access attempts $M_{RA}$ fall below the maximum attempts $M_{RA_{max}}$, the MS increases the random access attempts $M_{RA}$ by 1 in step 623 and then goes to step 605. That is, the MS re-determines the beam subsets in step 605 and repeats steps 607 through 621.

By contrast, when the random access attempts $M_{RA}$ is greater than or equal to the maximum attempts $M_{RA_{max}}$, the MS determines the preamble transmission failure for the random access in step 625. This equals the final failure of the random access.

Figure 7:
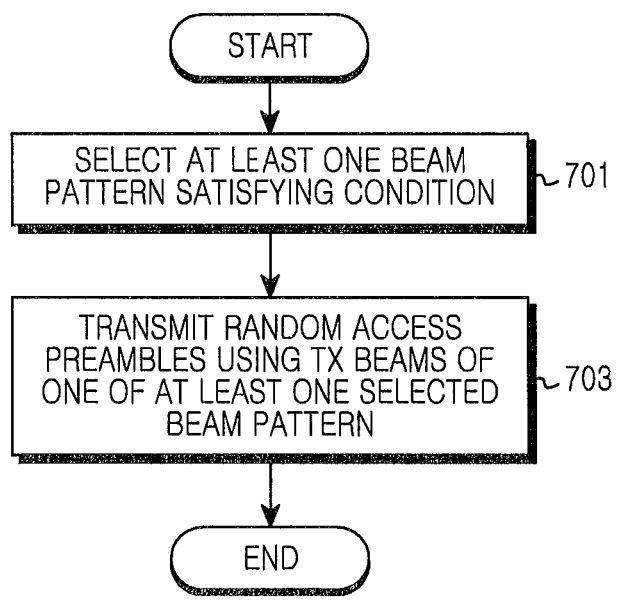
FIG. 7 illustrates operations of the MS in the wireless communication system according to another exemplary embodiment of the present disclosure.

FIG. 7 illustrates operations of the MS in the wireless communication system according to another exemplary embodiment of the present disclosure.

Referring to FIG. 7, the MS selects at least one beam subset satisfying the condition in step 701. The beam subset indicates the set of the beams radiated to different directions, and the MS stores the plurality of the beam subsets. The condition signifies whether the target Rx power of the BS can be satisfied by considering at least one of the beamforming gain, the path loss, and the power adjustment value based on the preamble type, and is determined for each beam of the beam subsets. The MS selects at least one beam subset of which all the beams satisfy the condition. For example, the condition can be defined based on Equation 3 or Equation 6. Alternatively, although some beams do not meet the condition, the corresponding beam subset can be selected and the number or the rate of the beams not meeting the condition can be differ according to various exemplary embodiments.

In step 703, the MS transmits the random access preambles using the Tx beams of one of the at least one selected beam subsets. That is, when the plurality of the beam subsets is selected in step 701, namely, when the plurality of the beam subsets satisfies the condition, the MS needs to reselect one beam subset. For example, the MS can select one beam subset based on at least one of the history about the successful preamble transmission in the past random access and the number of the beams. By contrast, when the single beam subset is selected in step 701, the reselection of one beam subset is omitted. With the one beam subset, the MS repeatedly transmits the random access preambles as many times as the Rx beams of the BS over the single beam in the resource allocated for the random access in the UL period.

Although it is not illustrated in FIG. 7, when transmitting the random access preambles and then receiving the random access response in the DL period, the MS determines the successful preamble transmission for the random access and goes to the next process for the network access. For example, the next process can include at least one of ranging, capability negotiation, and registration.

By contrast, when receiving no random access response, the MS determines the random access failure, increases the Tx power of the random access preamble, and then retransmits the random access preambles. In so doing, the cycle for determining the failure can be defined based on the beam subset, the beam, or the preamble. For example, when the cycle of the failure determination is on the beam subset basis, the MS transmits the random access preambles on every beam of one beam subset and then determines the success or the failure. For example, when the cycle of the failure determination is on the beam basis, the MS transmits the random access preambles on the single beam and then determines the success or the failure. For example, when the cycle of the failure determination is on the preamble basis, the MS determines the success or the failure in every preamble transmission.

Although it is not illustrated in FIG. 7, to determine whether the condition is satisfied in step 701, the MS can measure the path loss using the reference signal received from the BS. After determining the path loss, the MS can generate the modified beam subset by excluding some beams based on the path loss. For example, the MS can exclude the beam having the path loss greater than a threshold.

Figure 8:
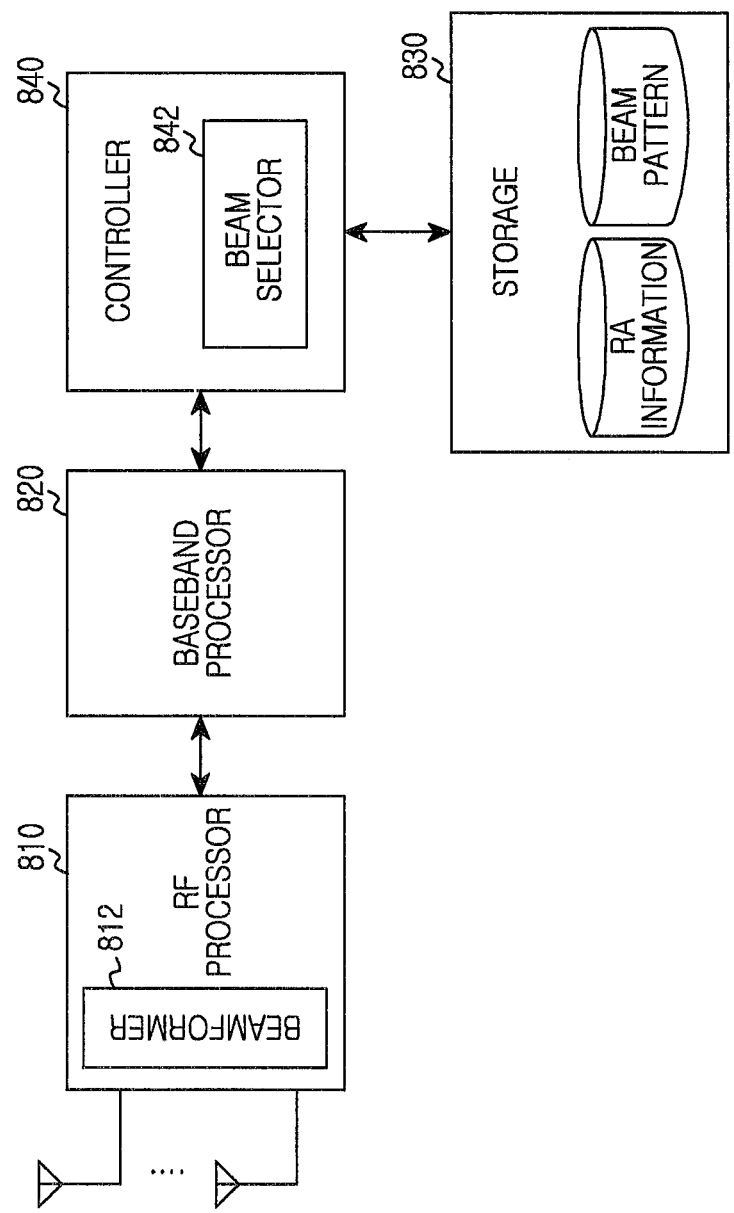
FIG. 8 illustrates the MS in the wireless communication system according to an exemplary embodiment of the present disclosure.

FIG. 8 is a block diagram of the MS in the wireless communication system according to an exemplary embodiment of the present disclosure.

Referring to FIG. 8, the MS includes a Radio Frequency (RF) processor 810, a baseband processor 820, a storage 830, and a controller 840.

The RF processor 810 transmits and receives signals over a radio channel through signal band conversion and amplification. That is, the RF processor 810 up-converts a baseband signal fed from the baseband processor 820 to an RF signal, transmits the RF signal over an antenna, and down-converts an RF signal received over the antenna to a baseband signal. For example, the RF processor 810 can include a Tx filter, an Rx filter, an amplifier, a mixer, an oscillator, a Digital-to-Analog Converter (DAC) and an Analog-to-Digital Converter (ADC). The MS can include a plurality of antennas, and the RF processor 810 can include a plurality of RF chains.

The RF processor 810 includes a beamformer 812 for the Tx beamforming and the Rx beamforming. The beamformer 812 can give the direction to the combination of the signals by adjusting a magnitude and a phase of the signals transmitted via the RF chains. The beamformer 812 can adjust the gain of the signals by adjusting the magnitude and the phase of the signals transmitted via the RF chains.

The baseband processor 820 converts the baseband signal and a bit stream according to a physical layer standard of the system. For example, for the data transmission, the baseband processor 820 generates complex symbols by encoding and modulating the transmit bit stream. For the data reception, the baseband processor 820 restores the received bit stream by demodulating and decoding the baseband signal fed from the RF processor 810. For example, in the data transmission based on the OFDM, the baseband processor 820 generates the complex symbols by encoding and modulating the transmit bit stream, maps the complex symbols to subcarriers, and generates OFDM symbols using Inverse Fast Fourier Transform (IFFT) and Cyclic Prefix (CP) addition. For the data reception, the baseband processor 820 splits the baseband signal fed from the RF processor 810 to OFDM symbols, restores the signals mapped to the subcarriers using FFT, and restores the received bit stream by demodulating and decoding the signals. As such, the baseband processor 820 and the RF processor 810 transmit and receive the signals. Hence, the baseband processor 820 and the RF processor 810 can be referred to as a transmitter, a receiver, or a transceiver.

The storage 830 stores a basic program for operating the MS, an application program, and data such as setting information. In particular, the storage 830 stores random access information provided from the BS. The random access information includes at least one of the resource location for the random access, the Rx beamwidth used by the BS, Rx beamforming gain of the BS, and the number of the Rx beams used by the BS in the random access period. The BS can periodically transmit the necessary information for the random access over the BCH. The storage 830 stores the information relating the plurality of the beam subsets. The beam subset indicates the set of the beams radiated to different directions. One beam subset can include the beams of different beamwidths. The storage 830 provides the stored data according to a request of the controller 840.

The controller 840 controls the operations of the MS. For example, the controller 840 transmits and receives the signals via the baseband processor 820 and the RF processor 810. The controller 840 includes a beam selector 842 for selecting the beam subset for the random access and attempting the random access according to the selected beam subset. For example, the controller 840 controls the MS to fulfill the method of FIG. 6 or Equation 7. The controller 840 operates as follows.

The controller 840 selects at least one beam subset satisfying the condition. The condition indicates whether the target Rx power of the BS can be satisfied by considering at least one of the beamforming gain, the path loss, the power adjustment value based on the preamble type, and is determined for each beam of the beam subsets. The controller 840 selects at least one beam subset including all the beams satisfy the condition. For example, the condition can be defined based on Equation 3 or Equation 6. Although some beams do not meet the condition, the corresponding beam subset can be selected and the number of the rate of the beams not meeting the condition can be differ according to various exemplary embodiments.

Using the Tx beams of one of the at least one beam subset selected, the controller 840 transmits the random access preambles via the baseband processor 820 and the RF processor 810. At this time, when multiple beam subsets satisfy the condition, the controller 840 needs to reselect one beam subset. For example, the controller 840 can select one beam subset based on at least one of history about the successful preamble transmission of the past random access, and the number of the beams.

When transmitting the random access preambles and then receiving the random access response in the DL period, the controller 840 determines the successful preamble transmission for the random access and proceeds to the next process for the network access. By contrast, when receiving no random access response, the controller 840 determines the random access failure, increases the Tx power of the random access preamble, and then retransmits the random access preambles. In so doing, the cycle for determining the failure can be defined based on the beam subset, the beam, or the preamble.

To determine whether the condition is satisfied, the controller 840 can measure the path loss using the reference signal received from the BS. The controller 840 can generate the modified beam subset by excluding some beams based on the path loss.

FIG. 8 is the block diagram of the MS. Similarly, the BS can also include an RF processor, a baseband processor, a storage, and a controller. The baseband processor and the RF processor can be referred to as a transmitter, a receiver, or a transceiver.

As set forth above, when the MS attempts the network access using the plurality of the beams in the wireless communication system, the random access is fulfilled adaptively according to the channel condition of the MS and thus the average network access time reduces.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method for operating a mobile station (MS) in a wireless communication system, the method comprising:
   receiving, from a base station (BS), information including a target receive (Rx) power value of the BS for a random access;
   determining, based on the target Rx power value of the BS, at least one beam subset including at least one transmit (Tx) beam of the MS, among a plurality of beam subsets; and
   transmitting a random access preamble using the at least one Tx beam included in the at least one beam subset.

2. The method of claim 1, wherein each of the plurality of beam subsets comprises a plurality of beams having different beamwidths from one another or a plurality of beams radiating to different directions from one another.

3. The method of claim 1, wherein determining the at least one beam subset comprises:
   selecting a beam subset including one or more Tx beams that satisfy a condition for a reception of the random access preamble by the BS through the target Rx power value, among the plurality of beam subsets,
   wherein whether the condition is satisfied is determined based on a beamforming gain, a path loss, and a power adjustment value for each of the Tx beams of the MS.

4. The method of claim 1, wherein transmitting the random access preamble using the at least one Tx beam included in the at least one beam subset comprises:
   determining a beam of at least one beam subset.

5. The method of claim 4, wherein determining the at least one the beam subset comprises:
   determining a beam subset having a highest preamble transmission success probability for the random access, based on a history of a past successful preamble transmission for each beam subset.

6. The method of claim 5, further comprising:
   if a preamble transmission for a random access of one beam subset is successful, updating the history for each beam subset.

7. The method of claim 4, wherein determining the at least one beam subset comprises:
   determining a beam subset having a smallest number of beams among the plurality of beam subsets.

8. The method of claim 4, wherein determining the at least one beam subset comprises:
   determining a beam subset having a smallest average of preamble transmissions until successful random access among the plurality of beam subsets.

9. The method of claim 3, wherein the path loss for each of the Tx beams of the MS is identified using a reference signal received from the BS.

10. The method of claim 9, further comprising:
    receiving the target Rx power value of the BS and a Rx beamforming gain value of the BS from the BS.

11. The method of claim 9, further comprising:
    generating a modified beam subset by excluding at least one beam from predefined beam subsets based on the path loss.

12. The method of claim 1, further comprising:
    receiving, from the BS, a random access response; and
    performing a network entry procedure with the BS.

13. The method of claim 1, further comprising:
    determining whether a preamble transmission for the random access is successful;
    when the random access fails, increasing a Tx power of the random access preamble; and
    transmitting the random access preamble.

14. A mobile station (MS) in a wireless communication system, the MS comprising:
    a receiver configured to receive, from a base station (BS), information including a target receive (Rx) power value of the BS for a random access;
    a controller configured to determine, based on the target Rx power value of the BS, at least one beam subset including at least one transmit (Tx) beam of the MS, among a plurality of beam subsets; and
    a transmitter configured to transmit a random access preamble using Tx beams included in the at least one beam subset.

15. The MS of claim 14, wherein each of the plurality of the beam subsets comprise a plurality of beams having different beamwidths from one another or a plurality of beams radiating to different directions from one another.

16. The MS of claim 14, wherein the controller is further configured to select a beam subset including one or more Tx beams that satisfy a condition for a reception by the BS for the random access preamble through the target Rx power value, among the plurality of beam subsets,
    wherein whether the condition is satisfied is determined based on a beamforming gain, a path loss, and a power adjustment value for each of the Tx beams of the MS.

17. The MS of claim 14, wherein the controller is configured to determine a beam of the at least one beam subset.

18. The MS of claim 17, wherein the controller is configured to determine a beam subset having a highest preamble transmission success probability for the random access determined based on a history of a past successful preamble transmission for each beam subset.

19. The MS of claim 18, wherein, if a preamble transmission for the random access is successful, the controller is configured to update the history for each beam subset.

20. The MS of claim 17, wherein the controller is configured to determine a beam subset having a smallest number of beams among the plurality of beam subsets.

21. The MS of claim 17, wherein the controller is configured to determine a beam subset having a smallest average of preamble transmissions until successful random access among the plurality of beam subsets.

22. The MS of claim 16, wherein the path loss for each of the Tx beams of the MS is identified using a reference signal received from the BS.

23. The MS of claim 22, wherein the receiver is further configured to receive the target Rx power value of the BS and a Rx beamforming gain value of the BS from the BS.

24. The MS of claim 22, wherein the controller is configured to generate a modified beam subset by excluding at least one beam from predefined beam subsets based on the path loss.

25. The MS of claim 14, wherein:
the receiver is further configured to receive, from the BS, a random access response, and
the controller is configured to perform a network entry procedure with the BS.

26. The MS of claim 14, wherein after transmitting the random access preamble, the controller is configured to:
determine whether a preamble transmission for the random access is successful;
when the random access fails, increase a Tx power of the random access preamble; and
transmit the random access preamble through the transmitter.

27. A method for operating a base station (BS) in a wireless communication system, comprising:
transmitting, to a mobile station (MS), information including a target receive (Rx) power value of the BS for a random access; and
receiving, from the MS, a random access preamble beamformed by the MS using at least one transmit (Tx) included in at least one beam subset,
wherein the at least one beam subset is determined by the MS based on the target Rx power value of the BS.

28. The method of claim 27, further comprising:
transmitting a random access response to the MS if the BS receives the random access preamble.

29. The method of claim 27, further comprising:
transmitting a Rx beamforming gain of the BS to the MS.

30. A base station (BS) in a wireless communication system, comprising:
a transmitter configured to transmit, to a mobile station (MS), signals including a target receive (Rx) power value of the BS for a random access, and
a receiver configured to receive, from the MS, a random access preamble beamformed by the MS using at least one transmit (Tx) beam included in at least one beam subset,
wherein the at least one beam subset is determined by the MS based on the target Rx power value of the BS.

31. The BS of claim 30, wherein the transmitter is configured to transmit a random access response to the MS if the BS receives the random access preamble.

32. The BS of claim 30, further comprising:
a transmitter configured to transmit a Rx beamforming gain of the BS to the MS.

* * * * *